United States Patent [19]

Oda et al.

[11] Patent Number: 5,462,470

[45] Date of Patent: Oct. 31, 1995

[54] GRINDING WHEEL SPINDLE ASSEMBLY

[75] Inventors: Yoshimasa Oda; Masato Ota, both of Narashino, Japan

[73] Assignee: Seiko Seiki Kabushiki Kaisha, Japan

[21] Appl. No.: 140,227

[22] Filed: Oct. 20, 1993

[30] Foreign Application Priority Data

Oct. 26, 1992 [JP] Japan ................................ 4-287940

[51] Int. Cl.$^6$ ...................................................... B24B 45/00
[52] U.S. Cl. ............................ 451/294; 451/11; 310/90.5
[58] Field of Search ........................... 51/166 R, 166 TS, 51/166 MH, 168, 134.5 R, 165.77, 165.74; 310/90.5, 67 R, 114, 268, 74; 451/294, 915

[56] References Cited

U.S. PATENT DOCUMENTS

| 1,500,401 | 7/1924 | Lauer-Schmaltz | 51/180 |
|---|---|---|---|
| 1,917,468 | 7/1933 | Steiner et al. | 51/134.5 R |
| 3,890,019 | 6/1975 | Boden et al. | 308/10 |
| 4,095,150 | 6/1978 | Senckel | 318/227 |
| 4,180,946 | 1/1980 | Heijkerskjold | 51/134.5 R |
| 4,568,862 | 2/1986 | Tassinario | 318/254 |
| 4,605,873 | 8/1986 | Hahn | 310/154 |
| 5,142,177 | 8/1992 | Higuchi et al. | 310/90.5 |

FOREIGN PATENT DOCUMENTS 0333352  9/1989  European Pat. Off. .

OTHER PUBLICATIONS

Patent Abstracts of Japan, vol. 10, No. 384 (E–466) (2441) 23 Dec. 1986.

Philips Technical Review, vol. 41, No. 11, 1989, Eindhoven, Netherland, pp. 348–361, E. M. H. Kamerbeek, "Magnetic Bearings".

Primary Examiner—Jack W. Lavinder
Attorney, Agent, or Firm—Adams & Wilks

[57] ABSTRACT

A grinding wheel spindle assembly comprises a first casing and a second casing spaced apart from and facing the first casing. A shaft has one end fixed to the first casing and another opposite end fixed to the second casing. A hollow, cylindrical-shaped rotor is rotatably disposed over the shaft between the first and second casings for rotation relative to the shaft. A flange having opposite side surfaces is connected to an outer circumference of the rotor for rotation therewith. A grindstone is connected to an outer circumference of the flange for rotation therewith. A radial magnetic bearing magnetically supports the rotor in its radial direction, and an axial magnetic bearing magnetically supports the rotor in its axial direction. At least one driving motor is provided for rotating the rotor about a center axis thereof.

19 Claims, 5 Drawing Sheets

GRINDING WHEEL SPINDLE ASSEMBLY

BACKGROUND OF THE INVENTION

1. Field of the Invention

This invention relates to grinding machines and, in particular, to a small, lightweight grinding wheel spindle assembly.

2. Description of the Prior Art

A conventional grinding wheel spindle assembly, as shown in FIG. 5, comprises a cylindrical-shaped rotating shaft 52 supported by bearings 51,51 within a housing 50, a grindstone (grinder) 54 mounted on one end of the rotating shaft 52 for relative rotation therewith through a flange 53, a pulley 56 provided on the other end of the rotating shaft 52, and a driving motor 55 coupling with the pulley 56 through a belt 57 and a motor pulley 58. The grindstone 54 is rotated together with the rotating shaft 52 which is driven by the driving motor 55 through the motor belt 58, belt 57 and pulley 56.

In the foregoing conventional grinding wheel assembly, the grindstone 54 is mounted on one end of the rotating shaft 52 for relative rotation therewith through the flange 53. The grindstone 54 and the flange 53 are mounted together as one unit and are sequentially arranged on an extended axis of the rotating shaft 52. Thus the length of the rotating shaft 52 is extended by a length corresponding to those of the grindstone 54 and the flange 53. Additionally, because the grindstone 54 and the flange 53 are arranged on one end of the rotating shaft 52, a greater thickness and larger diameter is required for the cylindrical-shaped rotating shaft 52 for maintaining a required rigidity thereof. Hence, a larger size housing 50 is required to house the rotating shaft 52 and the supporting members of the bearings 51,51 supporting the rotating shaft 52. Consequently, such conventional grinding wheel spindle assembly is relatively heavy and have rather large components which do not permit the assembly to be of reduced scale.

Moreover, in order to reduce a contact pressure between the relatively large and heavy grinding wheel spindle assembly, such as a depth-cutting motion unit, and a guide of a depth-cutting transfer structure, for depth-cutting of the depth-cutting motion unit, and to allow smooth relative sliding between the unit and the guide, a guiding surface of the guide is required to be formed wider is size and the driving motor selected for the unit must be larger. Such large and heavy grinding machine thus provided by the conventional art suffers from the drawback that it is unable to fine depth-cut with precision.

SUMMARY OF THE INVENTION

The present invention overcomes the drawbacks of the conventional grinding wheel assembly. An object of the invention is to provide a grinding wheel spindle assembly having a small size and a light weight.

To achieve this object, a first embodiment of a grinding wheel spindle assembly according to the present invention comprises: a first casing; a second casing spaced apart from and facing the first casing, each casing having inner wall surfaces; a shaft having one end fixed to the first casings and the other end fixed to the second casing; a hollow cylindrical-shaped rotor rotatably disposed over the shaft and between the first and second casings to undergo rotation relative to the shaft; a flange having opposite side surfaces disposed between the casings and connected to an outer circumference of the rotor for rotation therewith; a grindstone connected to an outer circumference of the flange for rotation therewith; a radial magnetic bearing disposed between an inner circumference of the rotor and an outer circumference of the shaft for magnetically supporting the rotor in its radial direction; an axial magnetic bearing disposed between the side surfaces of the flange and the inner wall surfaces of the casings for magnetically supporting the rotor in its axial direction; and driving motors or a driving motor disposed between the side surfaces of the flange and the inner wall surfaces of the casings or between the inner circumference of the rotor and the outer circumference of the shaft, respectively, for rotationally driving the rotor about a center axis thereof.

In another embodiment, a grinding wheel spindle assembly comprises: a first casing; a second casing spaced apart from and facing the first casing, each casing having inner wall surfaces; a hollow, cylindrical-shaped rotor rotatably disposed between the first and second casings to undergo rotation relative to the casings, the rotor having opposite ends each spaced apart from and facing respectively the first and second casings; a flange having opposite side surfaces disposed between the casings and connected to an outer circumference of the rotor for rotation therewith; a grindstone connected to an outer circumference of the flange for rotation therewith; radial magnetic bearings disposed between an outer circumference of the rotor and inner wall surfaces of the casings for supporting the rotor in its radial direction; an axial magnetic bearing disposed between the surfaces of the flange and inner wall surfaces of the casings for supporting the rotor in its axial direction; and driving motors or a driving motor disposed between the side surfaces of the flange and the inner wall surfaces of the casings or between the outer circumference of the rotor and the inner wall surface of the casing, respectively, for rotationally driving the rotor about a center axis thereof.

According to the present invention, because the grindstone and the flange are disposed on an extended center axis on an outer circumference of the rotor, the size of the grinding wheel spindle assembly towards the axial direction of the rotor is effectively reduced. In addition, the rotor has a higher rigidity due to its connection with the flange, permitting a rotor having a thinner thickness structure to be used. Thus a lightweight and reduced scale grinding wheel spindle assembly can be realized which can effectively grind with precision.

DETAILED DESCRIPTION OF THE PREFERRED EMBODIMENT

Embodiments of grinding wheel spindle assembly according to the present invention are described in detail referring to FIGS. 1 to 4.

Figure 1:
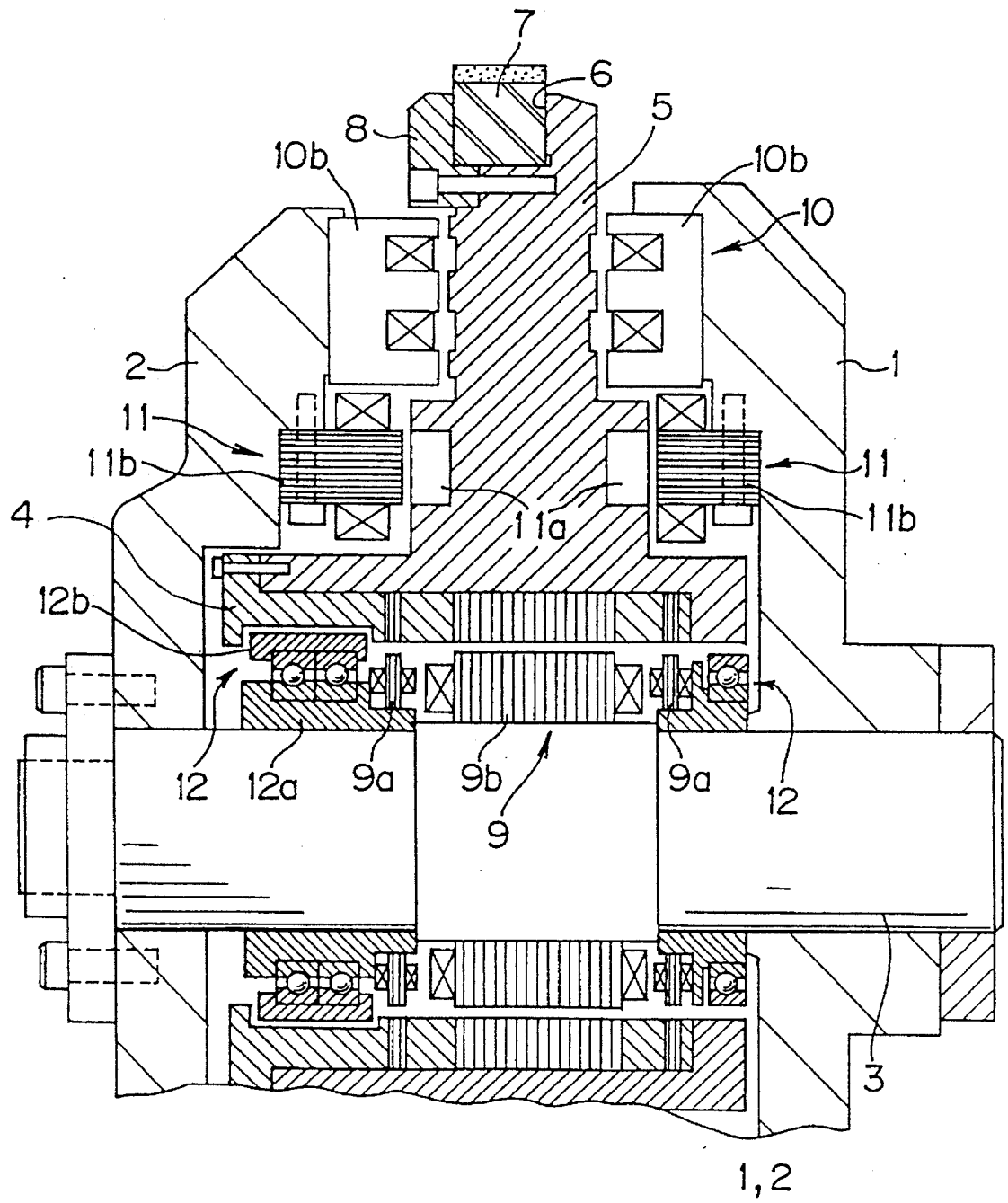
FIG. 1 is a view of a grinding wheel spindle assembly showing one embodiment according to the present invention.

In FIG. 1, a grinding wheel spindle assembly includes a pair of casings 1 and 2 each facing and being spaced apart from each other. A shaft 3 is disposed between the casings 1 and 2 and has one end fixed to a center portion of an inner wall surface of the casing 1, and the other end fixed to a center portion of an inner wall surface of the casing 2.

A hollow cylindrical-shaped rotor 4 is disposed between the casings 1 and 2 for rotation relative to the shaft 3. A flange 5 having opposite side surfaces is disposed between the casings 1,2 and is connected to an outer circumference of the rotor 4 for rotation therewith. Each side surface of the flange 5 faces and is spaced apart from a respective inner side wall surface of the casings 1 and 2, and is of a larger diameter than the inner wall surfaces of the casings 1 and 2. The flange 5 has an outer circumference protruding out of the casings 1 and 2.

A ring-shaped grindstone 7, which is releasably attached on a ring-shaped shoulder 6 formed on the outer circumference of the center flange 5, is connected to the outer circumference flange 5 by a retaining member 8. The grindstone 7 is thus connected to the outer circumference of the rotor 4 through the flange 5.

A radial magnetic bearing 9 is provided between an inner circumference of the rotor 4 and an outer circumference of the shaft 3. The radial magnetic bearing 9 comprises, for example, radial positional sensors 9a and a radial electromagnet 9b. The radial positional sensors 9a and the radial electromagnet 9b are disposed on the outer circumference of the shaft 3. The radial positional sensors 9a detect a distance from the rotor 4 along the radial direction of the rotor 4. The radial electromagnet 9b is excited in accordance with a detected value from the radial positional sensors 9a, and a magnetic force generated as a result of such excitation acts on the inner circumference of the rotor 4 to support the rotor 4 in its radial direction.

An axial magnetic bearing 10 is disposed between the side surfaces of the flange 5 and inner wall surfaces of the casings 1 and 2. The axial magnetic bearing 10 comprises, for example, axial positional sensors (not shown) and axial electromagnets 10b,10b. The axial positional sensors (not shown) and the axial electromagnets 10b,10b are disposed on the inner wall surfaces of the respective casings 1 and 2. The axial positional sensors detect a distance from an end surface of the rotor 4 or a distance from a side surface of the flange 5 each along an axial direction of the rotor 4. The axial electromagnets 10b,10b are excited with reference to a detected value from the axial positional sensors, and a magnetic force generated as a result of such excitation acts on the side surfaces of the flange 5 to support the rotor 4 in its axial direction.

Driving motors 11,11 are disposed respectively between a side surface of the flange 5 and a respective inner wall surface of the casings 1,2. The driving motors 11,11 allow the rotor 4 to rotate about its center axis together with the flange 5 and are arranged between the casings 1,2 opposing each other through the center flange 5. Armatures 11a,11a of the driving motors 11,11 are embedded in the side surfaces of the flange 5 respectively, and stators 11b,11b of the driving motors 11,11 are mounted on the inner wall surfaces of the casings 1 and 2.

Protective bearings 12,12 are disposed on opposite sides of the radial magnetic bearing 9. An inner ring 12a of the protective bearing 12 is connected to an outer circumference of the shaft 3, and an outer ring 12b thereof is disposed on the inner circumference of the rotor 4 at a radial slot formed thereon.

In the grinding wheel spindle assembly thus constructed, the radial magnetic bearing 9 and the axial magnetic bearing 10 support the rotor 4 in its axial direction and radial direction, respectively, and the driving motors 11,11 rotate the rotor 4, together with the flange 5, about its center axis.

Because the flange 5 is connected to an outer circumference of the rotor 4 and the grindstone 7 is connected to an outer circumference of the flange, the grindstone and the flange are provided together on an extended line of the outer circumference of the rotor, where an extension of the entire length of the rotor due to the grindstone and the flange does not arise. Thus, a grinding wheel spindle assembly of reduced size in the axial direction of the rotor is obtained. In addition, the flange increases the rigidity of the rotor without increasing its thickness, resulting in a small, lightweight grinding wheel spindle assembly. Thus a depth-cutting transfer structure for depth-cutting transfer of the small, lightweight grinding wheel spindle assembly is also effectively reduced in size.

The use of magnetic bearings provides a gap between the rotor and the magnetic bearing and produces an electrical positional change of the rotor. Thus, precise depth-cutting can easily be performed without moving the depth-cutting transfer structure.

The grindstone is connected to the outer circumference of the flange, the radial magnetic bearing is disposed between the outer circumference of the shaft and the inner circumference of the rotor, and the axial magnetic bearings and the driving motors are respectively disposed between a side surface of the flange and an inner wall surface of the casings. Thus the radial magnetic bearing, axial magnetic bearings and the driving motor are all disposed within the spaced apart casings, permitting workpieces to be simultaneously machined.

Figure 2:
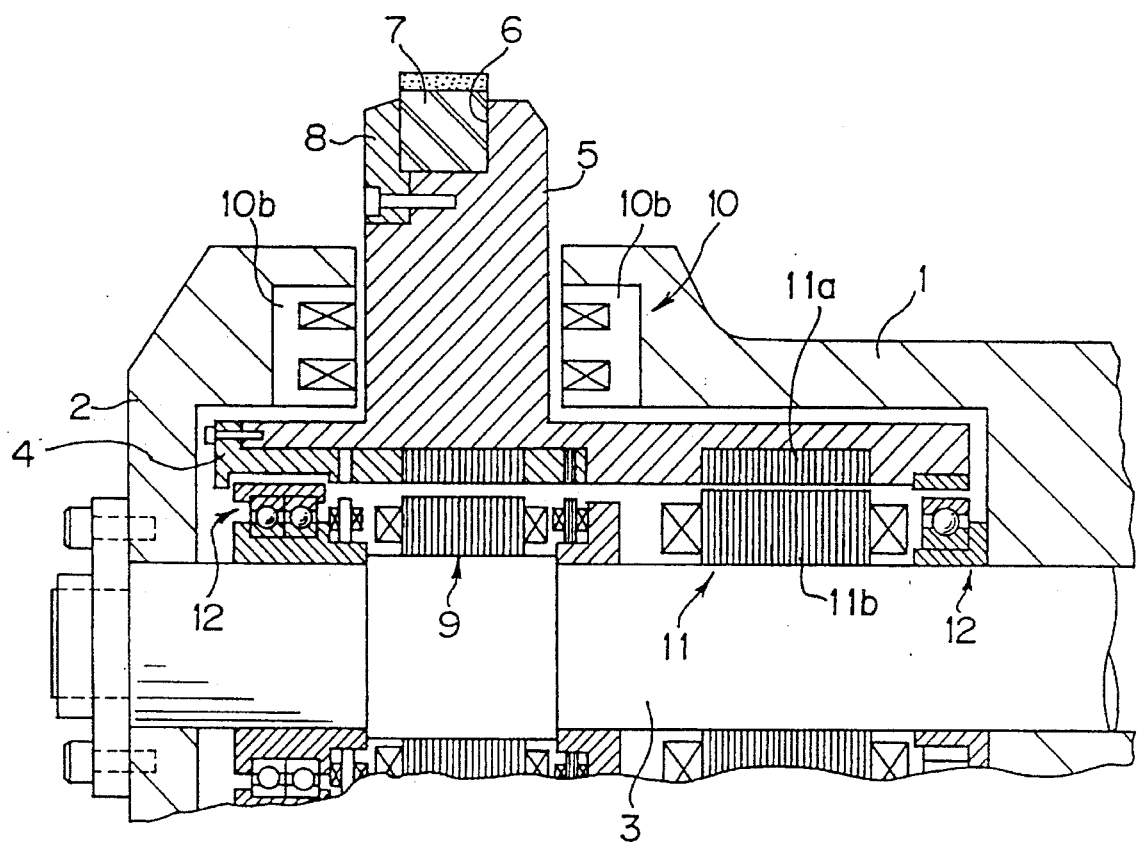
FIG. 2 is a sectional view of a grinding wheel spindle assembly showing another embodiment according to the invention.

In the embodiment hereinbefore described, the driving motors 11,11 are provided between the side surfaces of the flange 5 and the inner wall surfaces of the casings 1,2. However, in another embodiment, as shown in FIG. 2, a driving motor 11 may preferably be disposed between an outer circumference of the shaft 3 and the flange 5, where an armature 11a of the driving motor 11 is embedded in the flange and a stator 11b of the driving motor 11 is connected to the outer circumference of the shaft 3.

Figure 3:
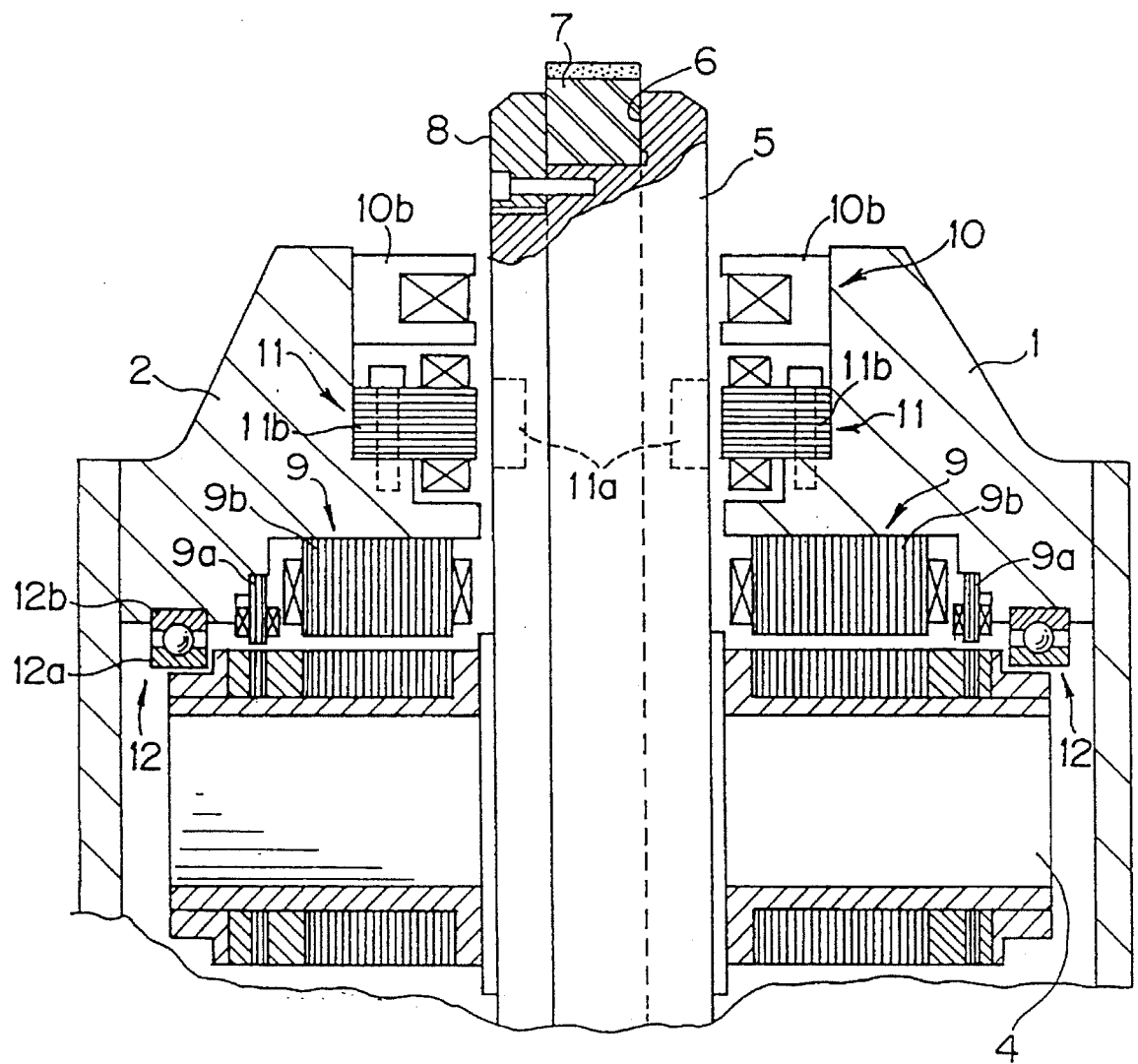
FIG. 3 is a sectional view of a grinding wheel spindle assembly showing another embodiment according to the invention.

FIG. 3 shows another embodiment of a grinding wheel spindle assembly according to the invention. The same reference numerals are given to the same members as those described in the embodiment of the grinding wheel spindle assembly with references to FIG. 1.

In the grinding wheel spindle assembly shown in FIG. 3, a rotor 4 is disposed for relative rotation between a pair of casings 1,2 each facing and being spaced from each other. The rotor 4 has one end facing and spaced apart from an inner wall surface of the casing 1 and the other end facing and spaced apart from an inner surface wall of the casing 2.

A flange 5 is disposed between the casings 1, 2 and is connected to an outer circumference of the rotor 4 for rotation therewith and a grindstone 7 is releasably connected to an outer circumference of the flange 5. The construction of the flange 5 and the releasable structure of the grindstone 7 are the same as in the embodiment formerly described. Therefore, a detailed description will therefore be omitted throughout.

Radial magnetic bearings 9,9 are provided facing respective side surfaces of the flange 5 between the outer circumference of the rotor 4 and the inner wall surfaces of the casings 1,2. The radial magnetic bearings 9,9 comprise a radial positional sensors 9a and electromagnets 9b. Each pair of the radial positional sensor 9a and the electromagnet 9b is disposed on inner wall surfaces of the casing 1 and the casing 2, respectively, and disposed on opposite sides of the flange 5. The radial positional sensors 9a detect a distance of the rotor 4 along a radial direction of the rotor 4. The radial electromagnets 9b are excited with reference to a detected value from the radial positional sensors 9a, and a magnetic force generated by such excitation acts on the outer circumference of the rotor 4 to support the rotor 4 in its radial direction.

An axial magnetic bearing 10 comprising electromagnets 10b, 10b is disposed between a respective surface of the flange 5 and the inner wall surface of the casings 1,2. Two driving motors 11,11 are provided between the side surfaces of the flange 5 and the inner wall surfaces of the casings 1,2. The constructions of the axial magnetic bearing 10 and the driving motors 11,11 is the same as for the embodiments previously described and, therefore, a detailed description thereof is omitted.

Protective bearings 12,12 are disposed on end sides of the rotor 4. Inner rings 12a of the protecting bearings 12 are disposed facing and at a very small distance from the outer circumference of the rotor 4, and outer rings 12b are respectively connected to the inner wall surfaces of the casings 1,2.

According to the present embodiment, the radial magnetic bearings 9 and the axial magnetic bearing 10 support the rotor 4 in a radial direction and in an axial direction of the rotor 4, respectively, and the driving motors 11,11 drive the rotor 4, together with the flange 5, about its center axis.

In the grinding wheel spindle assembly according to the present embodiment, the flange is connected to the outer circumference of the rotor and the grindstone is connected to the outer circumference of the flange. Because the grindstone and the flange are provided together on an extended line of the outer circumference of the rotor, an extension of an entire length of the rotor due to the grindstone and the flange does not arise and a grinding wheel spindle assembly which is of reduced size in the axial direction of the rotor is obtained. Additionally, a rotor with a thinner thickness can be used because the rotor has a high rigidity as a result of the flange being connected to an outer circumference thereof and a lightweight grinding wheel spindle assembly is achieved. Moreover, a depth-cutting transfer structure for depth-cutting transfer of the small, lightweight grinding wheel spindle assembly can in turn be reduced in size.

The use of magnetic bearings in this embodiment provides a gap between the rotor and the magnetic bearing and produces an electrical positional change of the rotor. Thus, fine depth-cutting can easily be performed without moving the depth-cutting transfer structure.

The grindstone is attached to the outer circumference of the flange, the radial magnetic bearings are disposed between the inner circumference of the rotor and inner wall surfaces of the casings, and the axial magnetic bearing and the driving motors are disposed between side surfaces of the flange and inner wall surfaces of the casings. Therefore, the radial magnetic bearings, axial magnetic bearing and the driving motors are all disposed between the casings so that workpieces disposed on opposite side surfaces of the grindstone can simultaneously be machined.

Figure 4:
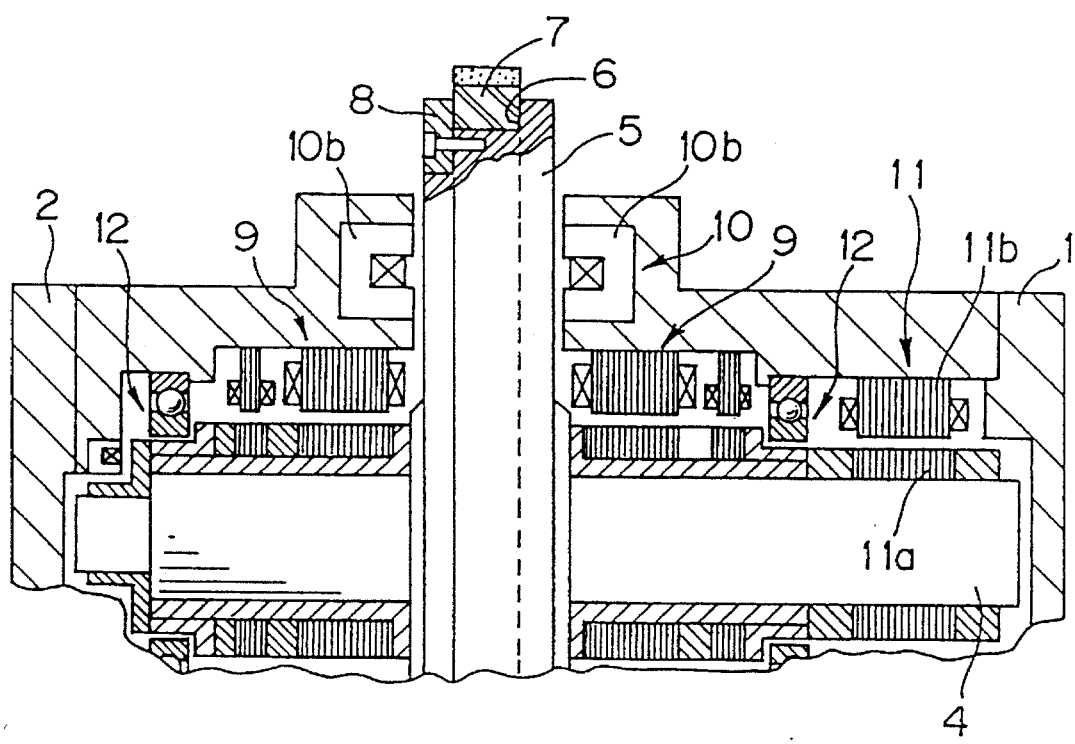
FIG. 4 is a sectional view of a grinding wheel spindle assembly showing another embodiment according to the invention.
Figure 5:
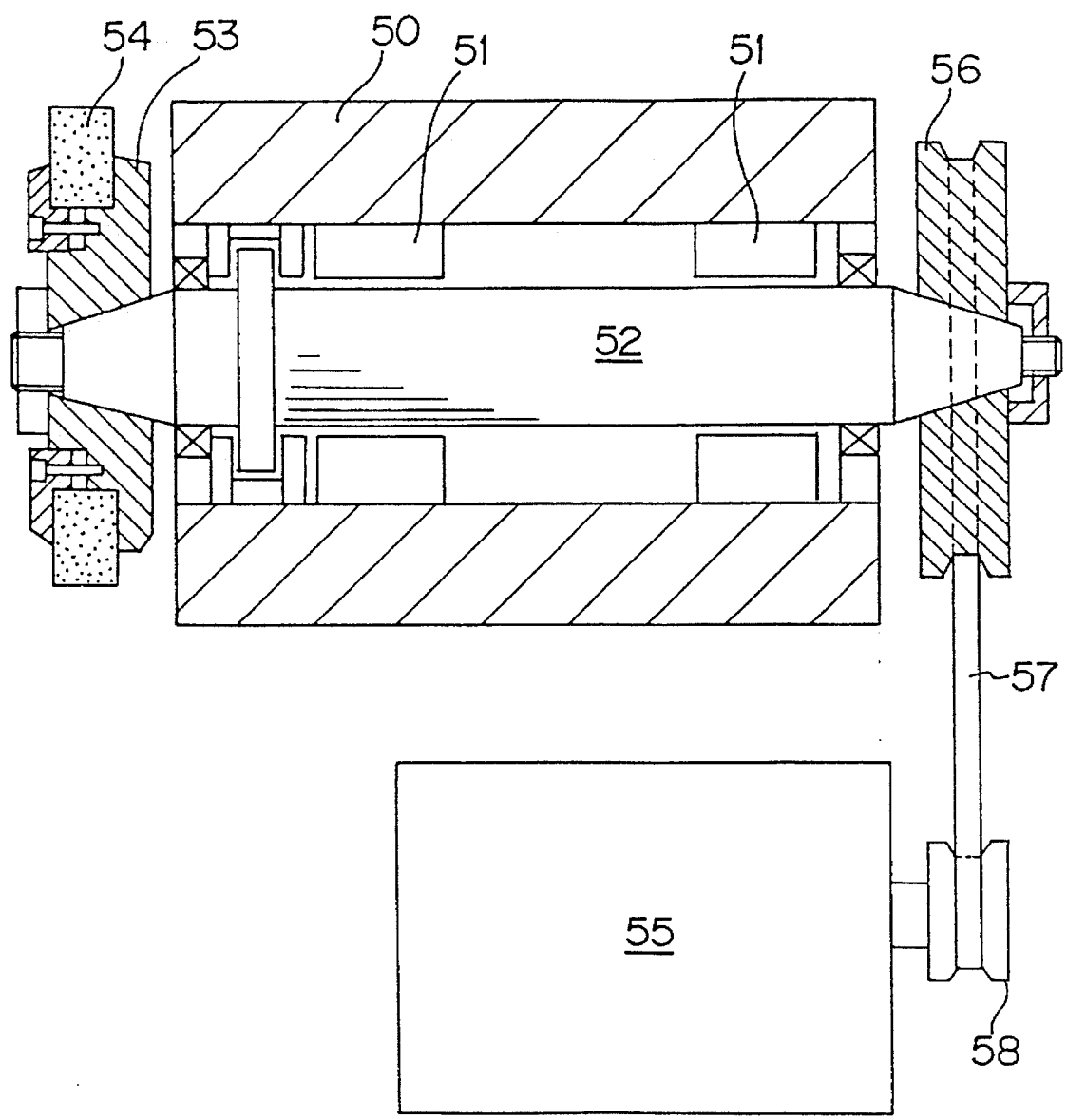
FIG. 5 is a sectional view of a conventional grinding wheel spindle assembly.

In the embodiment hereinbefore described, the driving motors 11 are provided between the side surfaces of the flange 5 and the inner wall surfaces of the casings 1,2. However, in another embodiment, as shown in FIG. 4, a driving motor 11 may preferably be disposed between an outer circumference of the shaft 3 and an inner circumference of the rotor 4, where armatures 11a of a driving motor 11 are disposed on the outer circumference of the rotor 4 and a stator 11b of the driving motor 11 is connected to the inner circumference of a casing 1.

In the grinding wheel spindle assembly according to the present invention, the flange is connected to the outer circumference of the rotor and the grindstone is connected to the outer circumference of the flange. Thus, the grindstone and the flange are disposed together on an extended line of the outer circumference of the rotor, where an extension of an entire length of the rotor due to the grindstone and the flange does not arise. Consequently, a grinding wheel spindle assembly which is reduced in size along the axial direction of the rotor is obtained. Additionally, a rotor with a thinner thickness can be used because the rotor has a high rigidity due to the center flange being connected at an outer circumference thereof. Therefore, a lightweight grinding wheel spindle assembly is obtained and, furthermore, a depth-cutting transfer structure for depth-cutting transfer of the small, lightweight grinding wheel spindle assembly can also be made smaller in size.

According to this embodiment of the grinding wheel spindle assembly, a gap is provided between the rotor and the magnetic bearing, and the electrical position of the rotor can be changed so that fine depth-cutting can easily be performed without moving the depth-cutting transfer structure.

From the foregoing description, it can be seen that the present invention comprises an improved grinding wheel spindle assembly. It will be appreciated by those skilled in the art, that changes could be made to the embodiments described in the foregoing description without departing from the broad inventive concept thereof. It is understood, therefore, that this invention is not limited to the particular embodiments disclosed, but is intended to cover all modifications which are within the scope and spirit of the invention as defined by the appended claims.

What is claimed is:

1. A grinding wheel spindle assembly comprising: a first casing; a second casing spaced apart from and facing the first casing; a shaft having one end fixed to the first casing and another opposite end fixed to the second casing; a hollow, cylindrical-shaped rotor rotatably disposed over the shaft and between the first and second casings to undergo rotation relative to the shaft; a flange having opposite side surfaces and connected to an outer circumference of the rotor for rotation therewith; a grindstone connected to an outer circumference of the flange for rotation therewith; radial magnetic bearing means for magnetically supporting the rotor in its radial direction; axial magnetic bearing means for magnetically supporting the rotor in its axial direction; and driving means for rotationally driving the rotor about a center axis thereof.

2. A grinding wheel spindle assembly as claimed in claim 1; wherein the radial magnetic bearing means is disposed between an inner circumference of the rotor and an outer circumference of the shaft.

3. A grinding wheel spindle assembly as claimed in claim 2; wherein the radial magnetic bearing means comprises at least one radial positional sensor and a radial electromagnet both connected to an outer circumference of the shaft.

4. A grinding wheel spindle assembly as claimed in claim 1; wherein the axial magnetic bearing means is disposed between the first and second casings and the side surfaces of the flange.

5. A grinding wheel spindle assembly as claimed in claim 4; wherein the axial magnetic bearing means comprises two electromagnets each connected respectively to an inner wall surface of the first and second casings.

6. A grinding wheel spindle assembly as claimed in claim 1; wherein the radial magnetic bearing means is disposed between an inner circumference of the rotor and an outer circumference of the shaft, and the axial magnetic bearing means is disposed between the first and second casings and the side surfaces of the flange.

7. A grinding wheel spindle assembly as claimed in claim 1; wherein the drive means is disposed between the first and second casings the side surfaces of the flange.

8. A grinding wheel spindle assembly as claimed in claim 1; wherein the drive means is disposed between the flange and an outer circumference of the shaft.

9. A grinding wheel spindle assembly comprising: a first casing; a second casing spaced apart from and facing the first casing; a hollow, cylindrical-shaped rotor rotatably disposed between the first and second casings to undergo rotation relative to the casings; a flange connected to an outer circumference of the rotor for rotation therewith and having opposite side surfaces facing respectively inner wall surfaces of the first and second casings; a grindstone connected to an outer circumference of the flange for rotation therewith; radial magnetic bearing means for magnetically supporting the rotor in its radial direction; axial magnetic bearing means, disposed between the first and second casings and the side surfaces of the flange, for magnetically supporting the rotor in its axial direction; and driving means for rotationally driving the rotor about a center axis thereof.

10. A grinding wheel spindle assembly as claimed in claim 9; wherein the radial magnetic bearing means is disposed between the first and second casings and an outer circumference of the rotor.

11. A grinding wheel spindle assembly as claimed in claim 10; wherein the radial magnetic bearing means comprises first and second magnetic bearings each disposed respectively between the first and second casings and an outer circumference of the rotor.

12. A grinding wheel spindle assembly as claimed in claim 11; wherein each of the first and second magnetic bearings comprises a positional sensor and an electromagnet both connected respectively to the first and second casings.

13. A grinding wheel spindle assembly as claimed in claim 9; wherein the axial magnetic bearing means comprises two electromagnets connected respectively to inner wall surfaces of the first and second casings.

14. A grinding wheel spindle assembly as claimed in claim 9; wherein the radial magnetic means is disposed between the first and second casings and an outer circumference of the rotor, and the axial magnetic bearing means is disposed between the first and second casings and the side surfaces of the flange.

15. A grinding wheel spindle assembly as claimed in claim 9; wherein the drive means is disposed between the first and second casings and the side surfaces of the flange.

16. A grinding wheel spindle assembly as claimed in claim 9; wherein the drive means is disposed between the first and second casings and an outer circumference of the rotor.

17. A grinding wheel spindle assembly comprising: a first casing; a second casing spaced apart from and facing the first casing; a shaft having one end fixed to the first casing and another opposite end fixed to the second casing; a hollow, cylindrical-shaped rotor rotatably disposed over the shaft and between the first and second casings for rotation relative to the shaft; a flange having opposite side surfaces and connected to an outer circumference of the rotor for rotation therewith; a grindstone connected to an outer circumference of the flange for rotation therewith; radial magnetic bearing means disposed between an inner circumference of the rotor and an outer circumference of the shaft for magnetically supporting the rotor in its radial direction; axial magnetic bearing means disposed between the first and second casings and the side surfaces of the flange for magnetically supporting the rotor in its axial direction; and drive means disposed between the first and second casings and the side surfaces of the flange for rotationally driving the rotor about a center axis thereof.

18. A grinding wheel spindle assembly as claimed in claim 17; wherein the radial magnetic bearing means comprises at least one radial positional sensor and a radial electromagnet both connected to an outer circumference of the shaft.

19. A grinding wheel spindle assembly as claimed in claim 17; wherein the axial magnetic bearing means comprises two electromagnets connected respectively to inner wall surfaces of the first and second casings.

\* \* \* \* \*